United States Patent Office 2,700,600
Patented Jan. 25, 1955

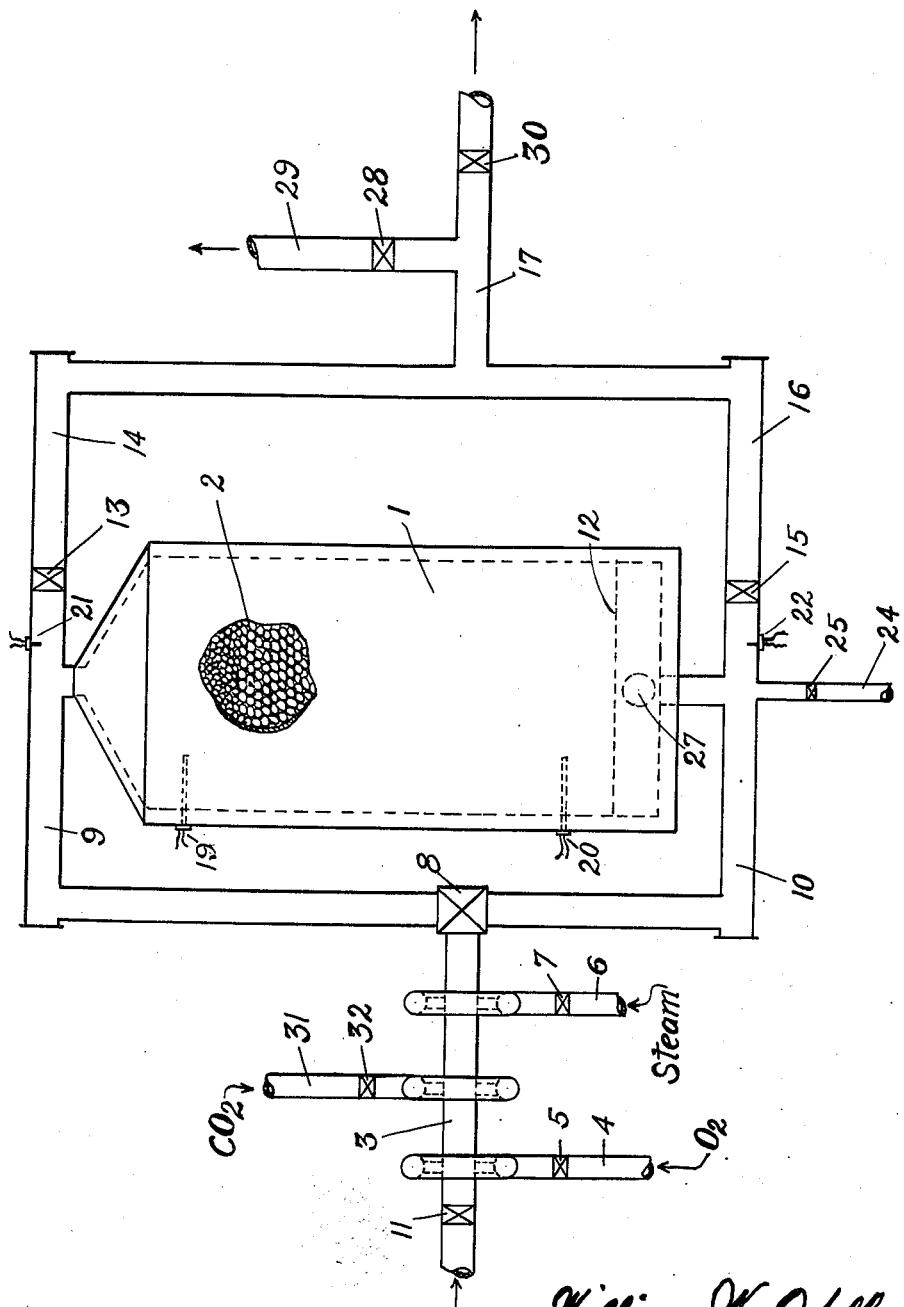

2,700,600

PROCESS OF TREATING GAS

William W. Odell, Amherst, Va.

Continuation of application Serial No. 670,409, May 17, 1946. This application January 16, 1952, Serial No. 266,614

16 Claims. (Cl. 48—197)

This invention relates to a substantially continuous process of treating gases and removing gum-forming hydrocarbons, nitrogen oxides, hydrocyanic acid and other impurities from gases containing said impurities. It particularly relates to the treatment of gases at higher temperatures than commonly used in purifying city gas for such uses where a high degree of purity is required, which gases usually contain hydrogen and frequently contain a hydrocarbon as an undesired component.

This application is a continuation of my application Serial No. 670,409, filed May 17, 1946, now abandoned.

It is understood that applicant does not desire to limit this invention to the treatment of gases containing very small amounts of impurities and hydrocarbons; it can be used successfully with gases containing very large amounts of such materials or containing substantially large amounts of vapor phase hydrocarbon.

One of the objects of this invention is the production of a gas of high degree of purity from water gas, reformed gases made by reacting hydrocarbons contained in the gas with both steam and oxygen, and other gases which initially contain an appreciable percentage of hydrogen. Other objects will become apparent from the disclosures made herein.

In the manufacture of ordinary water gas, for example, the major components are hydrogen and carbon monoxide in the respective amounts of about fifty and forty percent. However, besides these components there are present, usually, small amounts of impurities such as $H_2S$, $CS_2$, thiophene, mercaptans, organic sulphides, hydrogen cyanide, olefins, diolefins, methane and other undesired materials. In present practice the $H_2S$ is largely removed by absorption in water, an alkaline solution, or by reaction with iron oxide. Organic sulphur is largely removed in common practice by absorption in active carbon or oil washing. One known procedure for removing organic sulphur is by contacting the gas with a catalyst comprising thirty percent sodium carbonate and approximately seventy percent iron oxide; the reaction being conducted at about 180° to 200° C. In the latter operation the sodium carbonate is converted to sulphate and then new catalyst is required. So far as the inventor is aware a truly satisfactory procedure for removing the gum-forming components has not heretofore been provided. In the practice of this invention an economical procedure is provided in which catalyst need not be thus consumed and one which does not require separate heat exchangers to economize the sensible heat of the gas. For highest degree of purification and conversion it is usually preferable in the practice of this invention that the gas treated be first subjected to a rough or so-called "coarse" purification for the removal of the major portion of the $H_2S$, particularly if the gas to be treated initially contains large amounts of it.

This invention is particularly applicable to the treatment of gases at high temperatures preferably in the presence of steam or other endothermic oxidant such as $CO_2$ and a relatively small amount of an exothermic oxidant such as oxygen or air, whereby the desired conversion or decomposition of impurities is accomplished.

One form of apparatus in which this invention may be practiced is shown diagrammatically, in elevation in the figure which in essence is a flow diagram.

In the figure the reaction chamber 1 with grate 12 is filled with sized surface contact solids 2, which may be spherical or otherwise shaped, or broken solids of substantially uniform size, forming a deep bed. The gas to be treated is supplied through conduit 3 and three-way valve 8 which so controls the direction of gas flow to and through chamber 1. Thus gas from 8 may flow upwardly through conduit 9, down through the bed of solids in chamber 1, out at the bottom of 1, through valve 15 and conduit 16 and out to a cooling system through 17 and valve 30, or it may pass from 8 downwardly through conduit 10, up through the bed of solids in chamber 1 and out at the top of 1, through valve 13, conduit 14 and offtake 17 and valve 30. The direction of flow is controlled by operating valves 8, 13 and 15. Oxygen or air, as the case requires, is admitted through conduit 4 and valve 5, whereas steam is introduced through conduit 6 and valve 7. Thermocouples, suitably connected to indicate temperatures, are shown at 19, 20, 21 and 22. Means for supplying air for starting operations comprise conduit 24, valve 25 and ignition door 27. Valve 28 controls the flow of gas to stack 29 and valve 30 controls the flow of gas to a suitable holder or gas system.

Operations according to this invention are shown by examples as follows:

EXAMPLE 1

Removal of gum-forming hydrocarbons and $CH_4$ from water gas made from coal, incompletely carbonized coal and the like, composed chiefly of $H_2$ and CO but containing approximately 1.8 percent of $CH_4$ and 0.2 percent of illuminants which latter includes the gum-forming constituents, and 8 grains per 100 cubic feet of organic sulphur compounds. Chamber 1 is filled with carefully selected solids, preferably about 1 inch mean diameter in large reaction chambers and preferably spherical, which may be chiefly $SiO_2$, $Al_2O_3$, $Cr_2O_3$ or other highly refractory material. The size of the solids should preferably be appreciably smaller than 1 inch mean diameter in small size reactors. Combustible fuel gas (the water gas to be treated is satisfactory) is caused to flow through 3 by opening valve 11 and an excess of air for its combustion is admitted by opening valve 25. Valve 8 is so opened that the gas flows through 8 and 10 to the bottom of 1 where it mixes with air; the mixture being burned in 1 after it is ignited through ignition port 27. Combustion is continued and the air and gas ratios varied so that an appreciable thickness of bed 2 is heated to 1800° to 2300° F. meanwhile removing the products of combustion through 13, 14, 17, 28 and 29, valve 30 being closed. The gas valves 11 and 8 are now closed and a straight air blast is made removing the air similarly through 13, 14, 17, 28 and 29. The solids in the lowest zone of 1 will now be at about atmospheric temperature; a higher zone is now the hot zone in which the solids are heated to 1800° to about 2300° F. and the top-zone solids are at substantially less than 300° to 400° F. The apparatus of the figure is now ready for regular operation. Valve 30 is now opened and valves 28 and 25 are closed, water gas is admitted by opening valve 11, steam is introduced by opening valve 7 and a very small amount of oxygen or air is admitted by opening valve 5. The selection of $O_2$ or air is made chiefly in accordance with the requirements or limitations as to nitrogen content of the finished gas. If oxygen is used the amount, which may vary with different kinds of water gas from 0.2 to 5 percent or more, should be, in this example case, about 1.0 percent. The resulting gaseous products pass out at the top of 1, through 13, 14, 17, and valve 30 to the gas handling system. This is continued until the temperature of the gas stream leaving the top of the reaction chamber 1 reaches approximately 300° to 400° F. The operation is continued but the direction of flow of fluids through 1 is reversed, by reversing valve 8 and substantially simultaneously closing valve 13 and opening valve 15. The course of the gas stream from valve 8 is now through 9, 1, 15, 16, 17 and valve 30. When the temperature of the outlet gas from 1 reaches about 300° to 400° F. another reversal of flow through reaction chamber 1 is initiated. The process is continuous and the temperature is self-sustaining and the heat wave or hot zone travels alternately upwardly and downwardly through the bed of solid 2. It may be desirable at infrequent time intervals (periodically) to make a prolonged air blast to the stack by opening valve 25 allowing the outlet blast gas temperature to rise above 300° F. and admitting a small amount of gas through 11, 8, and 10 to 1, during a late stage of the air blast period. The gas-air mixture at this stage may be 1 volume of gas and 15 to 20 volumes of air.

During the regular gas-treating operation the proportions of $O_2$, gas and steam used in this example are:

|  | Cubic feet |
|---|---|
| Water gas | 1000 |
| Steam | 100 |
| Oxygen | 12 |

The pressure in the reaction chamber and system may be substantially atmospheric pressure or 10 to 20 atmospheres or more may prevail. One of the advantages of the use of superatmospheric pressure is that smaller equipment and lower linear velocities through the contact solids may be employed. Somewhat more steam is desired when operating under superatmospheric pressure than at atmospheric pressure to prevent carbon formation, although 200 cubic feet of steam per 1000 cubic feet of water gas is usually ample even at 20 atmospheres' pressure. There is no apparent advantage in appreciably preheating the gas or oxygen but the steam used should be at such a temperature relative to the oxygen and water gas that condensation of water vapor does not occur in the inlet conduits to the reaction chamber; the steam-gas mixture may enter the reaction chamber below 200° F. The linear velocity of the fluid stream into the bed of solids in the reaction chamber, calculated as at 60° F., may be of the order of 110 cubic feet per minute per square foot of equivalent grate area, namely per square foot of internal horizontal sectional area of said chamber.

The size of the solids used should be proportioned to the diameter of the reaction chamber; a size of about 0.75 to 1.5 inches mean diameter is satisfactory for large chambers having an internal diameter of 8 to 10 feet, whereas with chambers 4 to 5 feet internal diameter the size solids preferred is 0.3 to 0.8 inch. Although the solids should be as uniform in size as possible in order to minimize the "wall effect" and to minimize the necessity of periodically driving the heat to substantially one end of the reaction chamber, it is decidedly advantageous to employ metal spheres or the like at the top and bottom layers and these can be smaller than the other solids. The metal being a better conductor of heat than the ordinary refractory solids is perhaps an explanation of the leveling out effect of the metal solids on the T° zones. The temperature zones should be horizontal layers; the use of metal in the top and bottom layers is helpful in maintaining this condition.

The results obtained in this Example 1 are indicated by gas analyses as follows:

*Composition of the moisture free gases*

|  | Inlet Water Gas | Outlet Treated Gas |
|---|---|---|
| $CO_2$ | 4.0 | 3.9 |
| Illuminants | 0.2 | 0.0 |
| $O_2$ | 0.0 | 0.0 |
| $CO$ | 40.6 | 41.0 |
| $H_2$ | 49.8 | 51.5 |
| $CH_4$ | 1.8 | 0.1 |
| $N_2$ | 3.6 | 3.5 |
|  | 100.0 | 100.0 |
| Organic sulphur—Grains per 100 cubic feet | 8 | Trace |

The gum forming hydrocarbons which were present in the raw water gas were entirely eliminated and the volume of combustible gas was increased 4 percent. Apparently oxidation and re-forming reactions occur in the reaction chamber in a very efficient manner. Some of these reactions which can occur are:

(1) $CH_4 + 2O_2 = CO_2 + 2H_2O$
(2) $CH_4 + \frac{1}{2}O_2 = CO + 2H_2$
(3) $CH_4 + H_2O = CO + 3H_2$
(4) $CH_4 + 2H_2O = CO_2 + 4H_2$
(5) $CH_4 + CO_2 = 2CO + 2H_2$
(6) $CS_2 + 2H_2O = 2H_2S + CO_2$
(7) $CS_2 + 3O_2 = CO_2 + 2SO_2$
(8) $COS + H_2 = H_2S + CO$
(9) $2H_2S$ plus heat $= 2H_2 + S_2$
(10) $2NO + 2H_2 = 2H_2O + N_2$
(11) $C_2H_4 + 3O_2 = 2CO_2 + 2H_2O$
(12) $C_2H_4 + O_2 = 2CO + 2H_2$
(13) $C_2H_4 + 2H_2O = 2CO + 4H_2$ Diolefins polymerize, split, oxidize and also react with hydrogen to form saturated hydrocarbons which in turn are re-formed by reaction with steam to form CO and $H_2$ or with $O_2$ to form CO and $H_2$. Likewise Reaction 6 proceeds at quite low temperatures. Thus small amounts of hydrocarbons may be eliminated and the total volume of $CO + H_2$ increased simultaneously with the elimination of nitrogen oxides and gum-forming substances.

The invention is not limited as to the velocity of flow of fluids through the bed of solids. However, the time of contact of the fluids with the hot solids will vary according to the temperature of the solids and the nature of the gas being treated; experiments with a given gas at a chosen temperature will establish a possible limit.

The temperatures given in the example are those found to be satisfactory without the use of catalyst solids. Oxidation catalyst can be used at lower temperatures, particularly with some gases. Thiophene and some gum formers are best destroyed by high temperature treatment as described.

Coal gas or mixtures of water gas and coal gas may be similarly treated and the methane and ethylene and traces of other hydrocarbons are converted to hydrogen and oxide of carbon. As in Example 1 the use of steam preferably is in excess of the chemical requirements to satisfy reactions such as those indicated by Equations 3, 4, 6 and 13.

It will be noted that the stream initially containing the reactant fluid, in passing through the bed of prepared small size solids, as in reaction chamber 1 of the figure, first contacts relatively cool solids and as its travel continues its temperature is raised, layer by layer, to the maximum temperature in the hot zone of said bed and is then similarly cooled to a similar lower temperature. As the stream temperature rises in its travel through the bed it reaches a temperature where reactions such as shown in Equations 1, 2, 11 and 12 occur at a much faster rate than the steam hydrocarbon reactions and this is a very desirable condition; the endothermic reactions proceed rapidly only at higher temperatures, above about 1650° F. without a catalyst. Therefore, in promoting chemical reactions in a gas stream by this invention the oxidation of the hydrocarbons by oxygen is initiated before the oxidation of hydrocarbons by $CO_2$ or steam.

In most processes, so far as I am aware, the substitution of $CO_2$ for steam as a reactant for hydrocarbon conversion is not particularly advantageous since the heat required is substantially the same in each case, i. e., Equations 3 and 5. However, in this invention, and in the preparation of a synthesis gas for example, $CO_2$ is usually washed out of the raw gas made and is discarded. Its use in this invention is indicated to the extent it is available and to the limit placed by any particular ratio of $H_2$ to CO in the synthesis gas. Lower inlet and outlet temperatures can be used in this invention when $CO_2$ is employed replacing an equivalent of steam.

A catalyst may be used in any portion of the bed or the bed may be comprised substantially entirely of catalyst material. It should be selected in accordance with the sulphur content and other properties of the gas to be treated.

Although any operable temperature above about 1650° F. to 1850° may be employed a range found to be satisfactory and preferred is above about 1800° F. and not appreciably above 2300° F. A catalyst is not required at the latter temperatures.

Referring to the figure chamber 1 may be so designed that the bed of solid confined therein tapers downwardly in the lower portion thereof as mentioned in my Patent No. 2,494,576, dated January 17, 1950, relating to a process and apparatus for making combustible gas, and tapers upwardly in the upper portion thereof.

Having described my invention so that one skilled in the art can practice it with variations to suit a particular gas to be treated or to produce a particular finished beneficiated gas, I claim:

1. A process for treating a gas mixture containing a hydrocarbon to effect conversion of said hydrocarbon, which process comprises preliminarily heating an intermediate maximum temperature hot zone of an upright reaction chamber containing a continuous deep bed of small size solids by passing a combustible gaseous mixture lengthwise through said bed of small size solids, burning said combustible gaseous mixture in passing through the bed and continuing the combustion until an appreciable thickness of the bed is heated to a temperature of from 1650° F. to 2300° F., meanwhile removing the products of combustion from the reaction chamber, then discontinuing the combustion and passing a cooling fluid lengthwise through the bed until the solids near the point of introduction of the cooling blast are at about the temperature of the cooling fluid, the temperature of the solids at the opposite end of the chamber is below about 300° to 400° F., and the temperature of the solids at the intermediate hot zone of said bed is within the range of 1650° to about 2300° F.; then subjecting the gas to be treated for conversion of hydrocarbon to contact with the solids in said reaction chamber, by passing the gas mixture initially containing the hydrocarbon in admixture with free oxygen and a member of a group consisting of steam and $CO_2$ lengthwise through the entire bed of solids in said reaction chamber from the end thereof having a temperature below about 300° to 400° F. through the hot zone whereby conversion of the hydrocarbon is effected, and withdrawing the resulting products from the opposite end of the reaction chamber from the point of entry, the amount of oxygen in the gas mixture being just sufficient to maintain the temperature of 1650° to 2300° F. in the hot zone, and the total amount of oxygen and steam used being sufficient for the conversion of said hydrocarbon substantially without the production of carbon black.

2. A process for treating a gas mixture containing a hydrocarbon to effect conversion of said hydrocarbon, which process comprises preliminarily heating an intermediate maximum temperature hot zone of an upright reaction chamber containing a continuous deep bed of small size solids by passing a combustible gaseous mixture lengthwise through said bed of small size solids, burning said combustible gaseous mixture in passing through the bed and continuing the combustion until an appreciable thickness of the bed is heated to a temperature of from 1650° F. to 2300° F., meanwhile removing the products of combustion from the reaction chamber, then discontinuing the combustion and passing a cooling fluid lengthwise through the bed until the solids near the point of introduction of the cooling blast are at about the initial temperature of said cooling fluid, the temperature of the solids at the opposite end of the chamber is below about 300° to 400° F., and the temperature of the solids at an intermediate hot zone is about 1650° to about 2300° F.; then subjecting the gas mixture to be treated for conversion of hydrocarbon to contact with the solids in said reaction chamber, by passing a stream of the gas mixture initially containing the hydrocarbon in admixture with free oxygen and a member of a group consisting of steam and $CO_2$ lengthwise through the entire bed of solids in said reaction chamber from the end thereof having a temperature below about 300° to 400° F. through the hot zone whereby conversion of the hydrocarbon is effected, and withdrawing the resulting products from the opposite end of the reaction chamber from the point of entry, the amount of oxygen in the gas mixture being just sufficient to maintain the temperature of 1650° to 2300° F. in the hot zone, and the total amount of oxygen and steam used being sufficient for the conversion of said hydrocarbon without the production of carbon black, and reversing the direction of flow of the gas stream being treated when the temperature of the outgoing gases reaches about 300° to 400° F.

3. A continuous process for treating a gas mixture containing a hydrocarbon to effect vapor phase conversion of said hydrocarbon, which comprises initially establishing in a confined deep upright continuous bed of small sized solids a hot intermediate maximum temperature reaction zone having an elevated temperature substantially within the range of 1650 to 2300° F. by burning combustible gases therein, and establishing cool top and bottom end zones wherein the solids have a temperature substantially below 300 to 400° F. at the outer ends, then passing a gasiform fluid stream initially at a temperature substantially below 300 to 400° F. and initially containing a hydrocarbon constituent in vapor phase together with an endothermic gaseous oxidant selected from a group consisting of steam and $CO_2$ and a smaller quantity of an exothermic oxidant selected from a group consisting of oxygen and air, lengthwise completely through the bed of solids in one direction without addition of other fluids to the bed of solids, whereby a portion of the hydrocarbon is converted in said intermediate maximum temperature hot zone by reaction with said endothermic oxidizing gas and a part is exothermically oxidized to maintain the temperature of the intermediate reaction zone, removing the resulting fluid mixture from the bed at the end opposite the point of entry of the gasiform fluid stream at a temperature not exceeding 300 to 400° F., continuing the passage of the gasiform fluid stream to be treated in the same direction through the bed of solids until the temperature of the outgoing gases reaches about 300 to 400° F., then reversing the direction of flow through the bed and repeating the reversal whenever the temperature of the outgoing gases reaches about 300 to 400° F., the quantity of the exothermic oxidant in the gasiform fluid stream being just sufficient to continuously maintain the temperature in the hot reaction zone substantially within the range of 1650 to 2300° F. and the total quantity of gaseous oxidant being sufficient for conversion of the hydrocarbon without production of carbon black.

4. A process as set forth in claim 3 wherein substantially uniformly sized contact solids are employed in the intermediate hot zone and metallic solids of smaller size than the solids at the intermediate zone are employed adjacent the ends of the upright bed.

5. A process as set forth in claim 3, wherein the quantity of the endothermic oxidant is about 10 to 20% by volume of the gas mixture containing the hydrocarbon.

6. A process as set forth in claim 3 wherein the quantity of the exothermic oxidant is about .2 to 5% by volume of the gas mixture containing the hydrocarbon.

7. A process as set forth in claim 3, wherein the gas mixture undergoing treatment is water gas containing relatively small quantities of illuminants and methane as impurities.

8. A process as set forth in claim 3, wherein the gas mixture undergoing treatment contains a large quantity of vapor phase hydrocarbon.

9. A process as set forth in claim 8, wherein the endothermic oxidant is steam and is employed within the range of 10 to 20% by volume of the gas mixture undergoing treatment.

10. A process as set forth in claim 3, wherein substantially atmospheric pressure is maintained within the reaction chamber.

11. A process as set forth in claim 3, wherein superatmospheric pressure of approximately 10 to 20 atmospheres is maintained within the reaction chamber, thereby permitting lower linear velocities of the gases through the contact solids.

12. A process as set forth in claim 3, wherein $CO_2$ is included in the endothermic oxidant to permit the use of lower inlet and outlet temperatures.

13. A process as set forth in claim 3, wherein the bed of solids is comprised of catalytic material.

14. A process as set forth in claim 3, wherein the temperature of the hot zone is within the range of 1800° F. to 2300° F. and the process is carried out without the use of a catalyst.

15. A process as set forth in claim 3, in which the direction of flow through the bed of solids of the gasiform fluid stream undergoing treatment is periodically reversed whereby the hot zone travels alternately upwardly and downwardly through the bed of solids.

16. A continuous process of treating a gaseous mixture containing a hydrocarbon to effect vapor phase conversion of said hydrocarbon at elevated temperatures comprising first establishing a single deep continuous stationary bed of small contact solids in a reaction chamber, establishing a miximum temperature reaction hot zone having the approximate range of 1650° to 2300° F. intermediate the top and bottom of said bed of solids, and establishing cool top and bottom zones wherein the solids have a temperature substantially below 300 to 400° F. at the outer ends passing a gasiform fluid stream initially containing said hydrocarbon reactant mixed with an endothermic gaseous oxidant selected from a group consisting of $CO_2$ and steam, and an exothermic gaseous oxidant selected from a group consisting of air and oxygen alternately entirely through the bed from one end to the other without addition of fluid intermediate the ends of the bed, the amount of exothermic oxidant initially present in the gasiform fluid stream being substantially less than that of the endothermic gas but sufficient to maintain said high temperature in the high temperature zone only, and the total quantity of gaseous oxidant being just sufficient for conversion of the hydrocarbon substantially without production of carbon black, making the alternations from up runs to down runs periodically as the temperature of the gas leaving the bed reaches a temperature approximating 300° to 400° F., thereby promoting reaction of said reactant hydrocarbon in said stream within the hot zone while maintaining the top and bottom zones at temperatures considerably below that of the intermediate hot zone, the amount of endothermic oxidizing gas present being substantially less than the volume of the gas mixture being treated.

References Cited in the file of this patent

UNITED STATES PATENTS

| | | |
|---|---|---|
| 1,919,857 | Pier et al. | July 25, 1933 |
| 2,121,733 | Cottrell | June 21, 1938 |
| 2,421,744 | Daniels | June 10, 1947 |

FOREIGN PATENTS

| | | |
|---|---|---|
| 390,849 | Great Britain | Apr. 5, 1933 |